United States Patent [19]

Balasubramanian

[11] 4,212,073
[45] Jul. 8, 1980

[54] METHOD AND SYSTEM FOR SURFACE CONTOURING

[76] Inventor: N. Balasubramanian, 22908 Cricket Hill Rd., Cupertino, Calif. 95014

[21] Appl. No.: 969,241

[22] Filed: Dec. 13, 1978

[51] Int. Cl.$^2$ ............................................. G01B 11/24
[52] U.S. Cl. ..................................... 364/562; 364/525; 356/376; 356/375
[58] Field of Search ......................... 364/560, 562, 525; 356/374–376, 371, 358; 250/237 G, 558; 318/569

[56] References Cited

U.S. PATENT DOCUMENTS

| | | | |
|---|---|---|---|
| 3,828,126 | 8/1974 | Ramsey, Jr. | 356/376 |
| 3,866,052 | 2/1975 | Dimatteo et al. | 250/558 |
| 3,967,114 | 6/1976 | Cornillault | 356/371 |
| 4,088,408 | 5/1978 | Burcher et al. | 356/371 |
| 4,139,304 | 2/1979 | Redman et al. | 356/376 |
| 4,145,991 | 3/1979 | Dimatteo et al. | 356/375 |

*Primary Examiner*—Charles E. Atkinson
*Assistant Examiner*—Gary Chin
*Attorney, Agent, or Firm*—Joseph S. Iandiorio

[57] ABSTRACT

A method and system for surface contouring including: projecting a sinusoidal pattern on a surface to be tested; shifting the pattern in three steps at one-quarter period intervals of the sinusoidal pattern; sensing the intensity of the radiation from the test surface through a mask containing the same sinusoidal pattern at at least one position of the surface at each of the steps; storing the intensity sensed at each position at each step; for each of the positions adding the intensity of the first and third steps to produce a d.c. spatial frequency amplitude, subtracting the intensity of the third step from that of the first to obtain the cosinusoidal spatial frequency amplitude, and subtracting the intensity of the second step from the d.c. amplitude to produce the sinusoidal spatial frequency amplitude; combining the sinusoidal and cosinusoidal amplitudes to produce a trigonometric function of the phase angle of the projected sinusoidal pattern on the test surface and generating from the trigonometric function of the phase angle an output representative of the height of the surface at each position.

14 Claims, 10 Drawing Figures

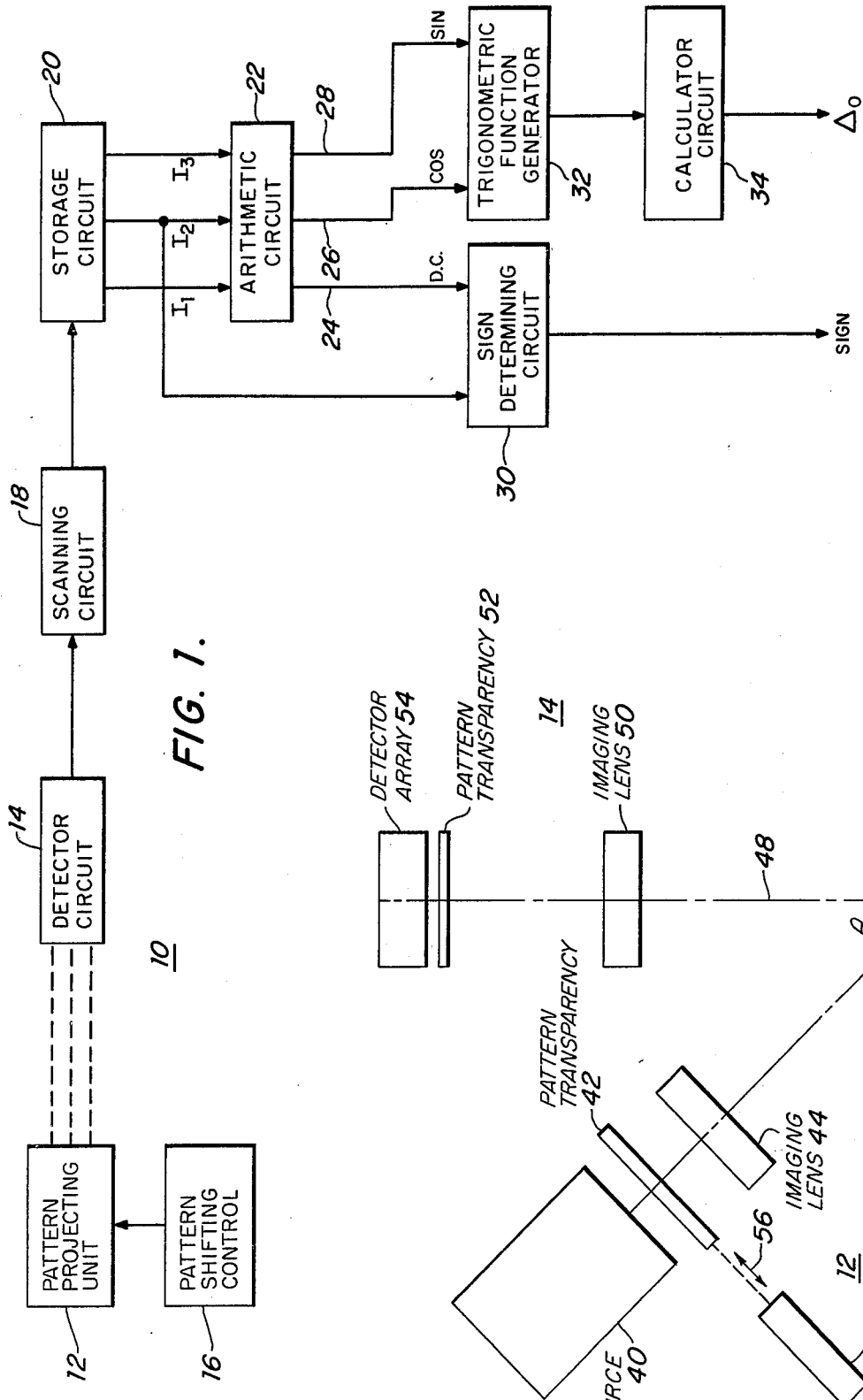

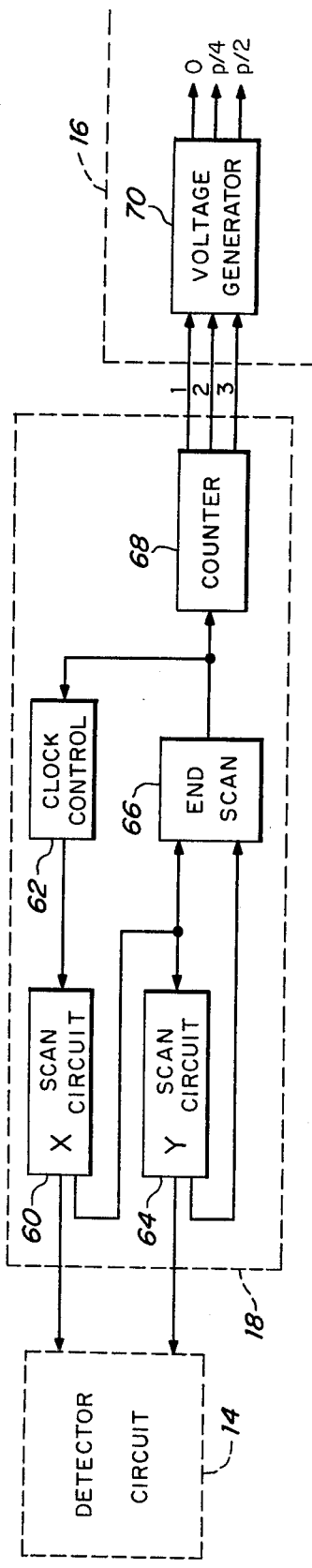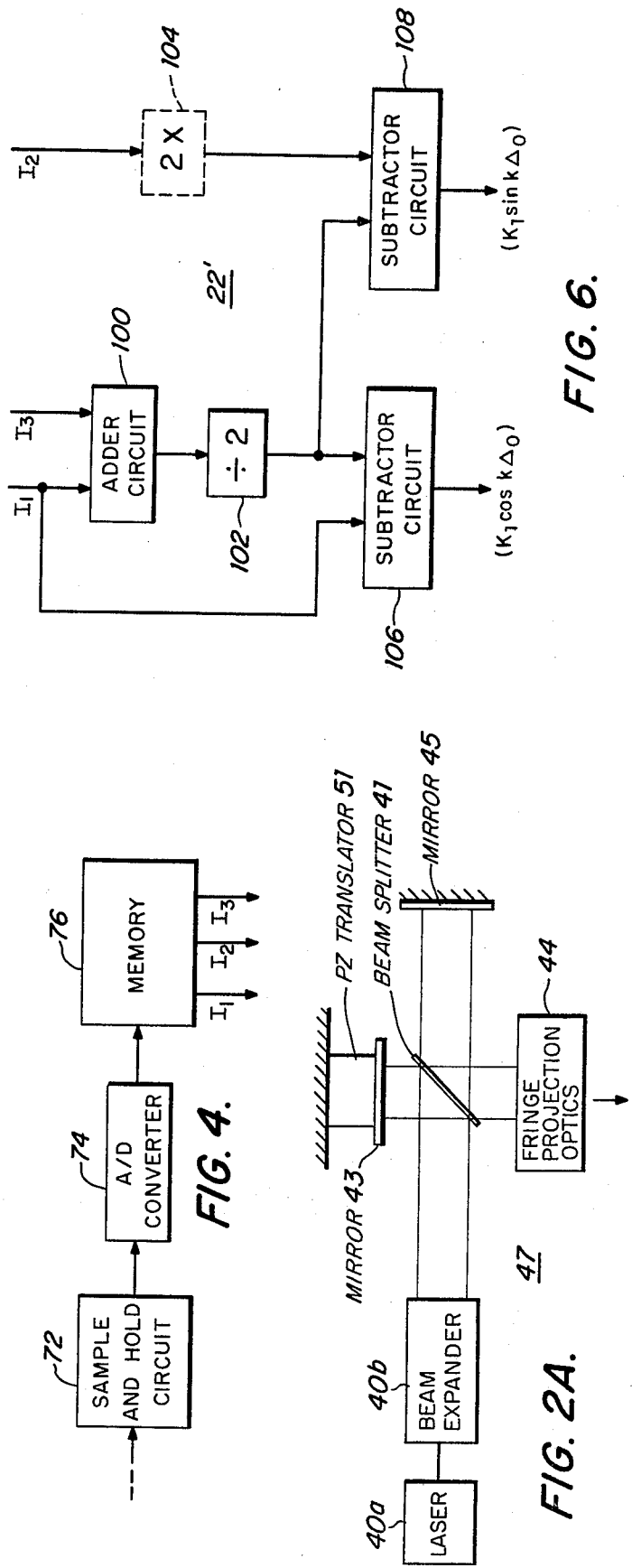

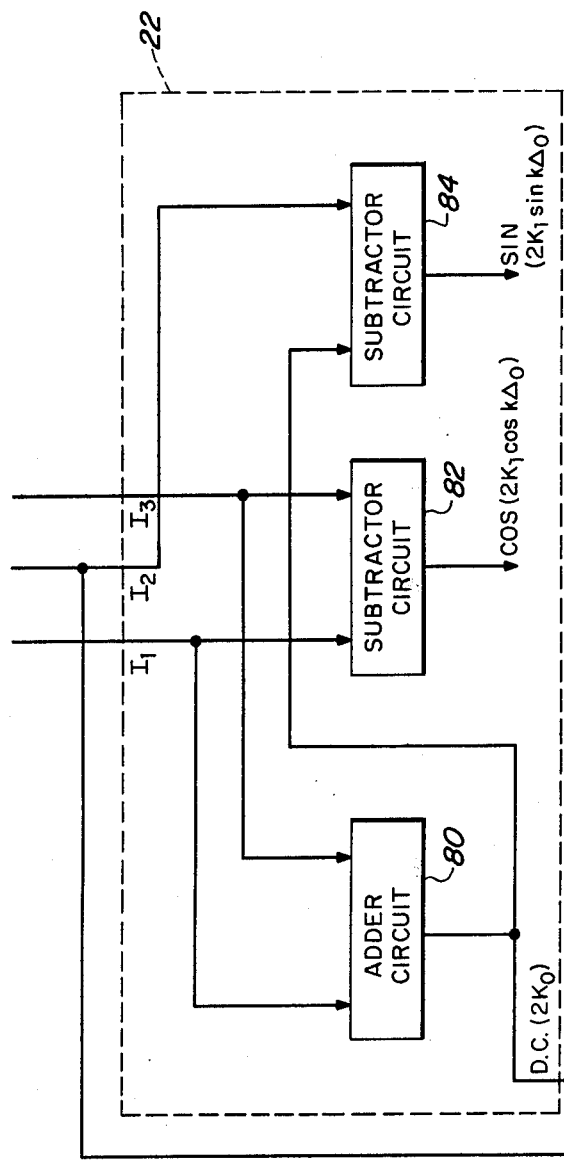
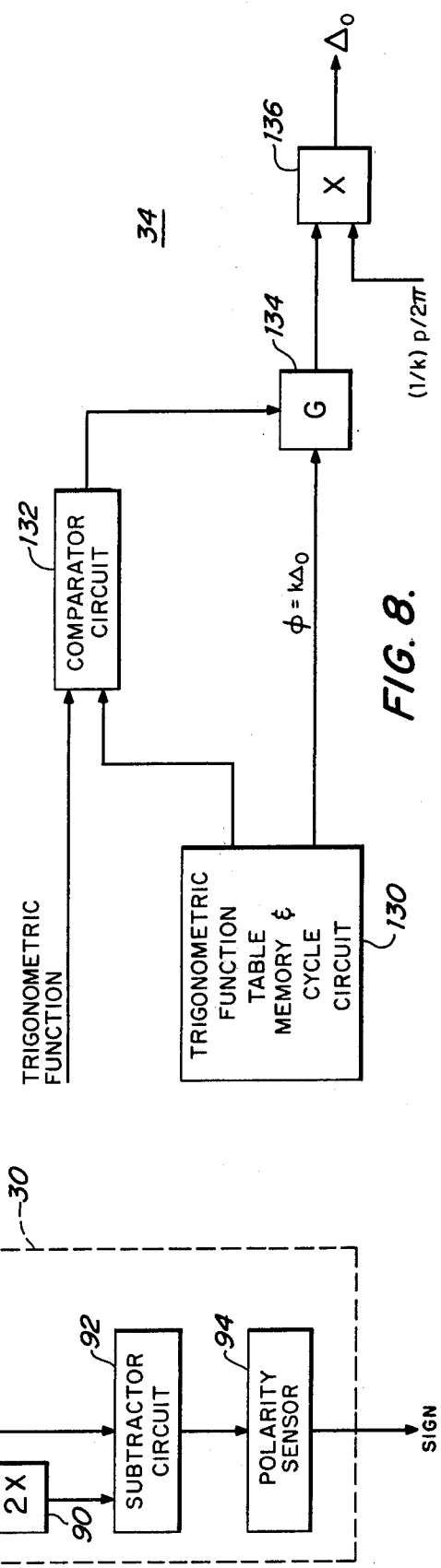

METHOD AND SYSTEM FOR SURFACE CONTOURING

FIELD OF INVENTION

This invention relates to a surface contouring method and system, and more particularly to one which uses intensity levels sensed at three different discrete steps to determine the contour of the surface being tested.

BACKGROUND OF INVENTION

In conventional moiré contouring techniques an amplitude grating such as a Ronchi ruling is placed close to an object or test surface whose contour is to be determined. The test surface is illuminated through a grating surface by radiation directed at an angle $\theta$ to a normal of the grating surface. Observation takes place along a normal, and the moiré pattern generated between the projected pattern on the object and the grating represents an instantaneous display of the elevation contours. Each of the fringes represents areas of equal elevation or height with reference to a datum plane of the surface. Typically these contours are digitized using complex data manipulation, algorithms, and large digital computers. Areas between the fringes must be ascertained by interpolation using even more complex data manipulation algorithms. This approach thus requires large, very powerful computing equipment which is expensive and in spite of its size and speed requires much time to complete the computations. These machines must be specially constructed or specially programmed to perform the analysis. The measurement is also time consuming and may take a minute or more. The extended time required for measurement leads to additional problems: vibrations taking place in the area of the machine interfere with the operations.

In one technique, the shadows on the test surface are formed using a projection system. The shadows or patterns on the object can be formed by either projecting the image of a Ronchi ruling or similar sinusoidal pattern onto the test surface or by interfering two coherent plane waves on the test surface. The pattern on the test surface is in turn directed through another Ronchi grading or sinusoidal pattern, the same as the first, and the resulting moiré fringes represent the elevation or height contours which can then be processed in the same way. However, since the contour intervals or fringes are a function of the period of the projected pattern, the resolution of the moiré contouring method depends upon the spatial frequency of the projected pattern. In order to increase resolution, the projection of the imaging systems must be low F-number systems. But this limits the elevation range, since as the F-number of an optical system is lowered its depth of field is reduced exponentially according to the second power. Attempts to improve the resolution while maintaining better depth of field and elevation range have met with indifferent success.

SUMMARY OF INVENTION

It is an object of this invention to provide an improved surface contouring system and method which greatly reduces necessary measurement and computational operations and time.

It is a further object of this invention to provide such a system and method which uses intensity levels sensed at three discrete steps to determine the contour elevation.

It is a further object of this invention to provide such a system and method which uses only a few simple arithmetic operations to obtain the height of a point on a surface.

It is a further object of this invention to provide a small, compact and extremely simple surface contouring method and system which can be implemented with inexpensive, standard components.

It is a further object of this invention to provide such a system which can compute measurement operations in a tenth of a second or less and which is virtually unaffected by normal building vibrations.

It is a further object of this invention to provide such a method and system which effects both improved resolution and improved range or depth of field yet requires less sophisticated optical components.

The invention results from the realization that the height of a point on a surface can be determined from the intensity levels detected at only three different discrete positions at quarter period intervals.

The invention features a surface contouring method and system for determining the height of a point on a surface. The method includes projecting a sinusoidal pattern on a surface to be tested and shifting a sinusoidal pattern in three steps at one-quarter period intervals of the sinusoidal pattern. The intensity is sensed at least one position at each of the steps, and those intensities are then stored. For each of the positions, the intensity of the first and third steps is added to produce the d.c. spatial frequency amplitude. The same intensities are subtracted to obtain the cosinusoidal spatial frequency amplitude, and the sinusoidal spatial frequency amplitude is obtained by subtracting from the d.c. spatial frequency amplitude the intensity of the second step. The sinusoidal and cosinusoidal amplitudes are then combined to produce a trigonometric function of the phase angle of the sinusoidal pattern reflected from a position of the surface. The trigonometric function of the phase angle is used to generate an output representative of the height at each position.

The system includes means for projecting a sinusoidal pattern on a surface to be tested. There are means for shifting the pattern in three steps at one-quarter period intervals of the sinusoidal pattern and mask means containing the same sinusoidal pattern. There is at least one detector for sensing, through the mask means, the intensity of the radiation from the test surface, and in most applications there is an array of such detectors. There is means for scanning each of the detectors at each step to obtain a signal representative of the level of intensity at each detector. The intensity level so sensed is stored. There are means responsive to the storing means for determining the d.c. spatial frequency amplitude from the sum of the intensity levels derived from the first and third steps and the cosinusoidal spatial frequency amplitude from the difference between those intensities. The sinusoidal spatial frequency amplitude is determined by the difference between the d.c. spatial frequency amplitude and the intensity level derived from the second step.

There are means for combining the sinusoidal and cosinusoidal spatial frequency amplitudes to generate an amplitude representative of the trigonometric function of the phase angle of the sinusoidal pattern projected on the test surface. The height of the surface at each position monitored by a detector is generated from the trigonometric function of the phase angle.

The sign of the phase angle or elevation difference may be determined by comparing the d.c. amplitude to twice the intensity level at the second step and indicating that the sign is positive when the d.c. amplitude is greater, and negative when it is smaller, than the intensity level at the second step.

DISCLOSURE OF PREFERRED EMBODIMENT

Other objects, features and advantages will occur from the following description of a preferred embodiment and the accompanying drawings, in which:

FIG. 1 is a simplified block diagram of a surface contouring system according to this invention;

FIG. 2 is a more detailed schematic diagram of the pattern projecting unit, detector circuit and portions of the pattern shifting control of FIG. 1;

FIG. 2A is a diagram of an alternative pattern projecting unit and pattern shifting control;

FIG. 3 is a more detailed block diagram of the scanning circuit and pattern shifting control of FIG. 1;

FIG. 4 is a more detailed block diagram of the storage circuit of FIG. 1;

FIG. 5 is a more detailed block diagram of the arithmetic circuit of FIG. 1;

FIG. 6 is a block diagram of an alternative arithmetic circuit;

FIG. 8 is a more detailed block diagram of an implementation of the calculator circuit of FIG. 1.

Figure 7:
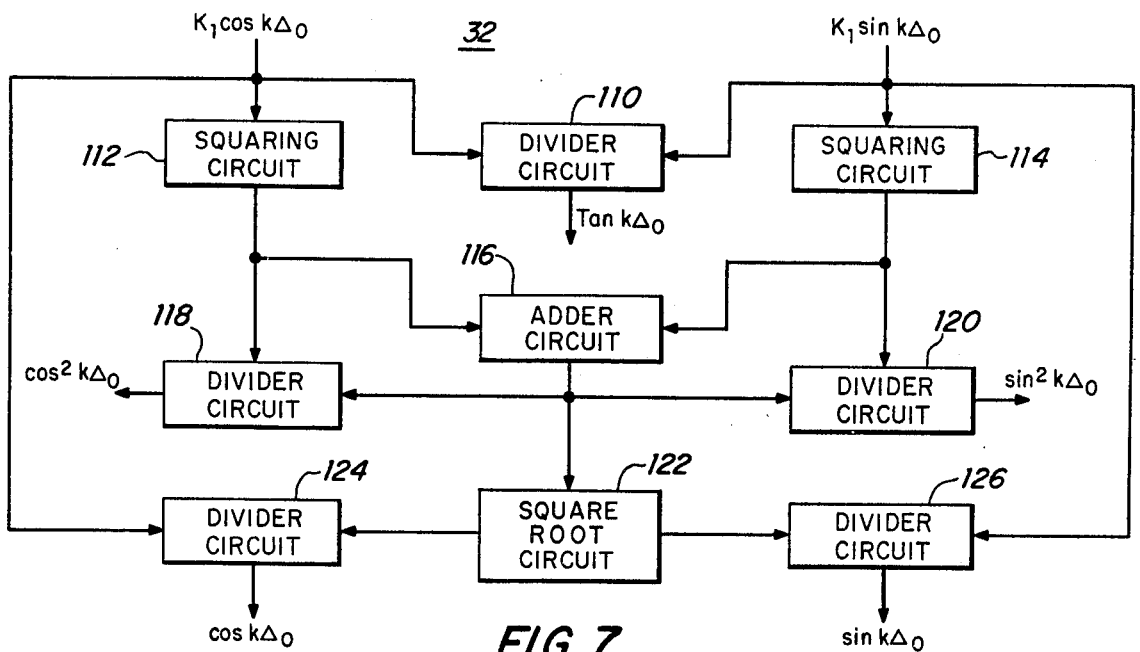
FIG. 7 is a more detailed block diagram of a multifunction implementation of the trigonometric function generator of FIG. 1.

The invention may be accomplished by projecting a sinusoidal pattern on a surface to be tested. Some means is necessary for shifting the pattern relative to the test surface. The pattern is shifted in three discrete steps at one-quarter period intervals of the pattern: the first or zero step; the second step at a one-quarter period (90°) interval from the first step; and a third step at an additional one-quarter period interval and a half period (180°) from the first. There is a mask provided which contains the same sinusoidal pattern.

There is at least one detector for sensing through the mask the intensity of the radiation from the test surface. More typically, there is an array of such detectors so that the process is carried out at each of the detectors simultaneously. For satisfactory results, the detector aperture is greater than the spacing of the fringes of the pattern by a factor of five or more. Each detector is scanned at each step to obtain from the detector a signal representative of the level of intensity at each detector. These intensity levels are stored separately for each detector for each step. The means for storing may include a sample and hold circuit for receiving the scanned inputs and submitting them to an A to D converter, which then delivers them to a digital memory for subsequent processing. For each detector, the first and third intensities are combined additively to produce the d.c. spatial frequency amplitude, and differentially to produce the cosinusoidal spatial frequency amplitude. The sinusoidal spatial difference in amplitude is then found from the difference between the d.c. amplitude and the second intensity. These three amplitudes may include a constant which can be eliminated at the generation of these amplitudes or subsequently when the trigonometric function is being generated. The sign of the height of a point in the surface can be immediately determined by subtracting from the d.c. amplitude twice the intensity level at the second step. If the d.c. amplitude is greater, the sign is positive; if smaller, the sign is negative. This does not necessarily require a second circuit, as the sinusoidal spatial frequency amplitude is the result of that arithmetic combination and may be used as an ancillary source to determine the sign.

Once the cosinusoidal and sinusoidal spatial frequency amplitudes have been determined, they are used to generate any one of a number of trigonometric functions of the phase angle of the radiation from the test surface, e.g. sine, cosine, tan, cotan, sine$^2$, and cosine$^2$. Subsequent to the development of a trigonometric function of the phase angle, the phase angle is specifically determined and from it the height of the surface at each position may be simply calculated.

That this approach is sound can be seen from the following analysis. The intensity distribution on the test surface is given by:

$$I(x,y) = A_o + A_1 \cos \frac{2\pi}{p} (x + h(x,y)\tan\theta) \quad (1)$$

where h(x,y) is the height of the object on the test surface, p is the period of the fringe pattern and $\theta$ is the angular tilt of the surface with respect to the optical axis of the pattern projection system.

Assume 1:1 imaging between the test surface and mask plane. The intensity distribution in the image plane is given by:

$$I'(x,y) = K_s(x,y) [A_o + A_1 \cos \frac{2\pi}{p} (x + h(x,y)\tan\theta] \quad (2)$$

where $K_s(x,y)$ takes into account the surface reflectance variations across the surface.

Let the intensity transmittance of the mask be $$T(x,y) = B_o + B_1 \cos\left(\frac{2\pi}{p} x\right) \quad (3)$$

The intensity distribution just behind the mask that is detected by the detector array is given by:

$$I_o(x,y) = T(x,y) I'(x,y) \text{ or} \quad (4)$$

$$I_o(x,y) = K_s(x,y) [A_o + A_1 \cos \frac{2\pi}{p} (x + h(x,y) \tan \theta]$$

$$X[B_o + B_1 \cos \frac{2\pi}{p} x], \text{ or}$$

$$I_o(x,y) = K_s(x,y) [A_oB_o + B_oA_1 \cos \frac{2\pi}{p} (x + h(x,y) \tan \theta) +$$

$$A_oB_1 \cos \frac{2\pi}{p} x + A_1B_1 \cos \frac{2\pi}{p} (2x + h(x,y) \tan \theta) +$$

$$A_1B_1 \cos \frac{2\pi}{p} h(x,y) \tan \theta]$$

If the projected pattern is laterally shifted by a distance $\Delta$ along the x direction, equation (1) becomes:

$$I(x,y) = A_o + A_1 \cos \frac{2\pi}{p} (x + h(x,y) \tan \theta + \Delta) \quad (5)$$

The corresponding modification to the equation (4) is:

$$I_o(x,y) = K_s(x,y) \, [A_oB_o + B_oA_1 \cos \frac{2\pi}{p} x + h(x,y)\tan \theta + \Delta ) + \tag{6}$$

$$A_oB_1 \cos \frac{2\pi}{p} x + A_1B_1 \cos \frac{2\pi}{p} (2x + h(x,y) \tan \theta + \Delta ) +$$

$$A_1B_1 \cos \frac{2\pi}{p} [h(x,y) \tan \theta + \Delta ]]$$

If the detector aperture is much larger than the period p, the first three cosine terms are not resolved and their average value is zero. The detector output then appears as:

$$I_o(x,y) + K_dK_s(x,y) \, [A_oB_o + A_1B_1 \cos \frac{2\pi}{p} h(x,y) \tan \theta + \Delta ] \tag{7}$$

where $K_d$ is a detector constant.
Equation (7) can be simplified as:

$$I_o(x,y) = k_o + k_1 \cos \frac{2\pi}{p} [h(x,y) \tan \theta + \Delta ] \tag{8}$$

where
$k_o = K_dK_s(x,y) \, A_oB_o$
$k_1 = K_dK_s(x,y) \, A_1B_1$
Now $\Delta$ can be made 0, p/4 or p/2.
When $\Delta = 0$ $$I_1(x,y) = k_o + k_1 \cos \frac{2\pi}{p} h(x,y) \tan \theta \tag{9}$$

When $\Delta = p/4$ $$I_2(x,y) = k_o - k_1 \sin \frac{2\pi}{p} h(x,y) \tan \theta \tag{10}$$

When $\Delta = p/2$ $$I_3(x,y) = k_o - k_1 \cos \frac{2\pi}{p} h(x,y) \tan \theta \tag{11}$$

Equations (9), (10), and (11) are:

$$I_1(x,y) = k_0 + k_1 \cos k\Delta_0 \tag{12}$$

$$I_2(x,y) = k_0 - k_1 \sin k\Delta_0 \tag{13}$$

$$I_3(x,y) = k_0 - k_1 \cos \Delta_0 \tag{14}$$

where $k = 2\pi/p$, and $\Delta_0 = h(x,y) \tan \theta$
The sum of (12) and (14) is:

$$I_1 + I_3 = 2K_0 \tag{15}$$

while the difference is:

$$I_1 - I_3 = 2K_1 \cos k\Delta_0 \tag{16}$$

and the difference of (15) and (13) is:

$$I_1 + I_3 - I_2 = 2K_1 \sin k\Delta_0 \tag{17}$$

The term $2K_0$ represents the d.c. spatial frequency amplitude; $2K_1 \cos k\Delta_0$ the cosinusoidal spatial frequency amplitude; and $2K_1 \sin \cos k\Delta_0$ the sinusoidal spatial frequency amplitude. Once the cosinusoidal and sinusoidal amplitudes are obtained the generation of a trigonometric function of the phase angle $\phi$ ($k\Delta_0$) is easily made with any of a number of prior art techniques and the value of $\Delta_0$ is calculated. For example, where $\theta = 45°$, $\tan \theta = 1$ and:

$$\tan \phi = \frac{I_1 + I_3 - I_2}{I_1 - I_3} \tag{18}$$

$$\phi = k\Delta_0 \tag{19}$$

$$\Delta_0 = \frac{1}{k} \phi \tag{20}$$

$$h(x,y) = \frac{p}{2\pi} \phi \tag{21}$$

In one embodiment the system 10, FIG. 1, includes a pattern projecting unit 12 which projects a sinusoidal pattern onto the object or test surface. This pattern is sensed by detector circuit 14 through a mask containing the same pattern. The pattern may be any reference ruling, e.g. Ronchi ruling or other pattern in which the relationship of the light and dark portions or fringes is sinusoidal. The fringes may be straight, curved, circular or any other shape desired for use with a particular test surface. The shifting of the projected pattern is controlled by the pattern shifting control 16, which shifts the pattern in three steps at one-quarter period intervals of the pattern. At each of those steps, detector 14 is read out by scanning circuit 18, whose output is delivered to storage circuit 20. Each of the intensity levels derived from each of the three steps $I_1$, $I_2$, $I_3$ is delivered from storage circuit 20 to arithmetic circuit 22, which simply calculates for each detector the d.c. spatial frequency amplitude 24, the cosinusoidal spatial frequency amplitude 26 and the sinusoidal spatial frequency amplitude 28. The d.c. spatial frequency amplitude 24 is combined with the second intensity $I_2$ in the sign determining circuit 30, which determines whether the sign of the height of the surface being contoured is positive or negative, depending upon whether the d.c. amplitude is greater or less than twice the intensity level of the second step.

The cosinusoidal and sinusoidal amplitudes are combined in a trigonometric function generator 32 to provide a trigonometric function of the phase angle, which is then delivered to height calculator circuit 34, which determines the phase angle and from it the actual height (h(x,y)) $\Delta_0$ at each point of the surface monitored by a detector.

Pattern projecting unit 12 may include an illumination source 40, FIG. 2, which illuminates a sinusoidal pattern which may be a Ronchi ruling, a grating, or a reproduction of such a sinusoidal pattern 42, which is then projected by a lens 44 onto the test object or surface 46 whose contour is to be measured. Preferably, the pattern is cast onto surface 46 at an angle $\theta$ of 45° to the normal 48 to the surface. The image of the pattern on surface 46 is viewed along the normal to surface 46 through lens 50. The pattern received by lens 50 is submitted through mask 52, which bears the same sinusoidal pattern as mask 42, to detector 54. Mask 52 has its fringes aligned with those of mask 42. Mask 42, and thus the projected pattern, may be shifted in three steps of quarter period intervals in the direction of arrow 56 by means of a piezo-electric crystal in crystal drive 58 mechanically connected to mask 42. Alternatively, illumination source 40, mask 42, and crystal drive 58 may be replaced by an interferometer which uses a laser 40a, FIG. 2A, and beam-expanding collimating optics 40b in conjunction with beam-splitter 41 and mirrors 43 and 45 to form an interferometer 47 which creates an interferogram which is a sinusoidal pattern that may be projected by lens 44 as explained in FIG. 2. The sinusoidal pattern may be moved in three steps of quarter period intervals by shifting mirror 43 in three steps of quarter period intervals by means of a piezo-electric crystal in crystal drive 51. Thus the three steps at quarter period intervals, the zero step, the quarter period step, and the half period step, may be obtained either by shifting the pattern itself in the lateral direction such as by shifting the mask which generates it, or by varying the optical path length in an interferometer in quarter wavelength intervals.

In FIG. 2A, crystal drive 51 would actually move mirror 43 through an eighth wavelength and a quarter wavelength interval in the second and third steps, respectively, due to the doubling factor introduced by the reflection of the radiation from surface 43. Detector 14 is typically an array of detectors including a matrix of individual detectors 32 on a side, 50 on a side, or even 100 on a side. Typically array 14 is but one inch square. Crystal drives 51 and 58 may be implemented by a device such as a Burleigh PZT aligner/translator, model PZ-91.

Scanning circuit 18, FIG. 3, includes an X scan 60 driven by clock control 62, and a Y scan 64 driven by X scan 60. An end of scan circuit 66 monitors the scanning operation and counter 68 is used to initiate a step request to pattern shifting control 16. In operation, pulses from clock control 62 cause X scan 60 to read out a row of detectors in the array of detector circuit 14. At the end of a row scan, the signal from the X scan output causes Y scan 64 to step to the next row. After the Y scan has stepped to the last row, the signal is provided to end scan 66 which upon the subsequent arrival of the last scan signal from X scan 60 produces an end of scan signal which turns off clock control 62 and steps counter 68 from the first step to the second. The X scan circuit 60 and Y scan circuit 64 may be set to scan 1, 32, 50, 100, or any other number of detectors that may be contained in detector circuit 14. Voltage generator 70 in pattern shifting control 16 generates zero voltage at the first step, the one-quarter period drive voltage at the second, and the one-half period drive voltage at the third. Detector circuit 14 and portions of scanning circuit 18 may be implemented with a single device known as a solid state self-scanning image photo detector array such as Fairchild CCD211; RCA 320X512 CED; Reticon RA032X32A; and IPI 2D1.

Storage circuit 20 may include sample and hold circuit 72, FIG. 4, which supplies the intensity level sensed by detector circuit 14 to A to D converter 74, which converts the signals to digital form for storage in digital memory 76. Each of the intensities sensed at each step by each of the detectors in detector circuit 14 is separately stored in memory 76.

Arithmetic circuit 22 may include simply an adder circuit 80, FIG. 5, and two subtractor circuits 82, 84. For each detector, the intensities from the first and third steps $I_1$ and $I_3$ are added by adder circuit 80 to produce the d.c. amplitude $2K_0$. The same intensities $I_1$ and $I_3$ may be subtracted in circuit 82 to provide the cosinusoidal amplitude $2K_1 \cos k\Delta_0$. The subtractor circuit 84 may subtract from the d.c. amplitude the intensity $I_2$ from the second step to produce the sinusoidal amplitude $2K_1 \sin k\Delta_0$. The cosinusoidal and sinusoidal amplitudes thus obtained may be forwarded directly to the trigonometric function generator 32. Sign determining circuit 30 may include a multiplication circuit 90 which multiplies by 2 the intensity level $I_2$ derived from the second step, and a subtractor circuit 92, which subtracts from the d.c. amplitude $(I_1+I_3)$ from adder circuit 80 the output of multiplier circuit 90, $I_2$. If the d.c. amplitude is greater than twice $I_2$, the output of subtractor circuit 92 is sensed by polarity sensor 94 to indicate a positive sign. If, conversely, the value of $2(I_2)$ is greater than the d.c. amplitude, then polarity sensor 94 indicates that the sign is negative. Alternatively, instead of providing a doubling circuit 90 in the $I_2$ input, a halving circuit could be supplied in the d.c. amplitude input from adder circuit 80.

Alternatively, arithmetic circuit 22', FIG. 6, may include adder circuit 100, divider circuit 102 or multiplier circuit 104, and two subtractor circuits 106 and 108. From this circuit the outputs $K_1 \cos k\Delta$ from subtractor circuit 106 and $K_1 \sin k\Delta$ from subtractor circuit 108 are obtained directly without the additional factor of 2, primarily from the use of divider circuit 102 which halves the input, or alternatively the multiplying circuit 104 which doubles the complementary input. As a result of this factor of 2 being removed from the arithmetic circuit, the output of subtractor circuit 108, that is $K_1 \sin k\Delta_0$ signal, may be fed directly to polarity sensor 94 to determine sign without multiplying circuit 90 and subtractor circuit 92.

Trigonometric function generator 32, FIG. 7, may include simply a divider circuit 110 for obtaining the trigonometric function, tangent, by simply dividing the sinusoidal amplitude $K_1 \sin k_0$ by the cosinusoidal amplitude $K_1 \cos k\Delta_0$.

Alternatively, trigonometric function generator 32 may include squaring circuit 112, squaring circuit 114, adder circuit 116, and either divider circuit 118 to obtain the trigonometric function cosine squared by dividing the square of the cosine by the sum of the squares of the sine and the cosine, or divider circuit 120 for obtaining the trigonometric function sine squared by dividing the square of the sine by the sum of the squares of the sine and the cosine.

Further, alternatively, trigonometric function generator 32 may include squaring circuits 112 and 114, adder circuit 116, square root circuit 122, and either divider circuit 124 for obtaining the trigonometric function cosine by dividing the cosine by the square root of the sum of the cosine squared and sine squared, or divider circuit 126 for obtaining the trigonometric function sine by dividing the sine by the square root of the sum of the cosine squared and sine squared.

The factor of two introduced by the arithmetic circuit of FIG. 5 is removed by generator 32.

Any one of these outputs: tangent, cosine squared, sine squared, cosine, or sine, may be used in height calculator circuit 34. The squared functions of cosine and sine are preferred since their values run only between zero and +1, making for a limited table memory requirement.

Height calculator circuit 34 includes a trigonometric function table memory and cycle circuit 130, and comparator circuit 132 which compares the incoming trigonometric function such as cosine squared, for example, with the values of that function stored in table 130. When a match is found, comparator circuit 132 enables gate 134 to pass the corresponding phase angle $\phi$ equal to $k\Delta_0$ to multiplier circuit 136, where it is multiplied by the value of $1/k$, or $p/2\pi$, to obtain the height $\Delta_0$ of the surface at the position monitored by the particular detector.

Figure 9:
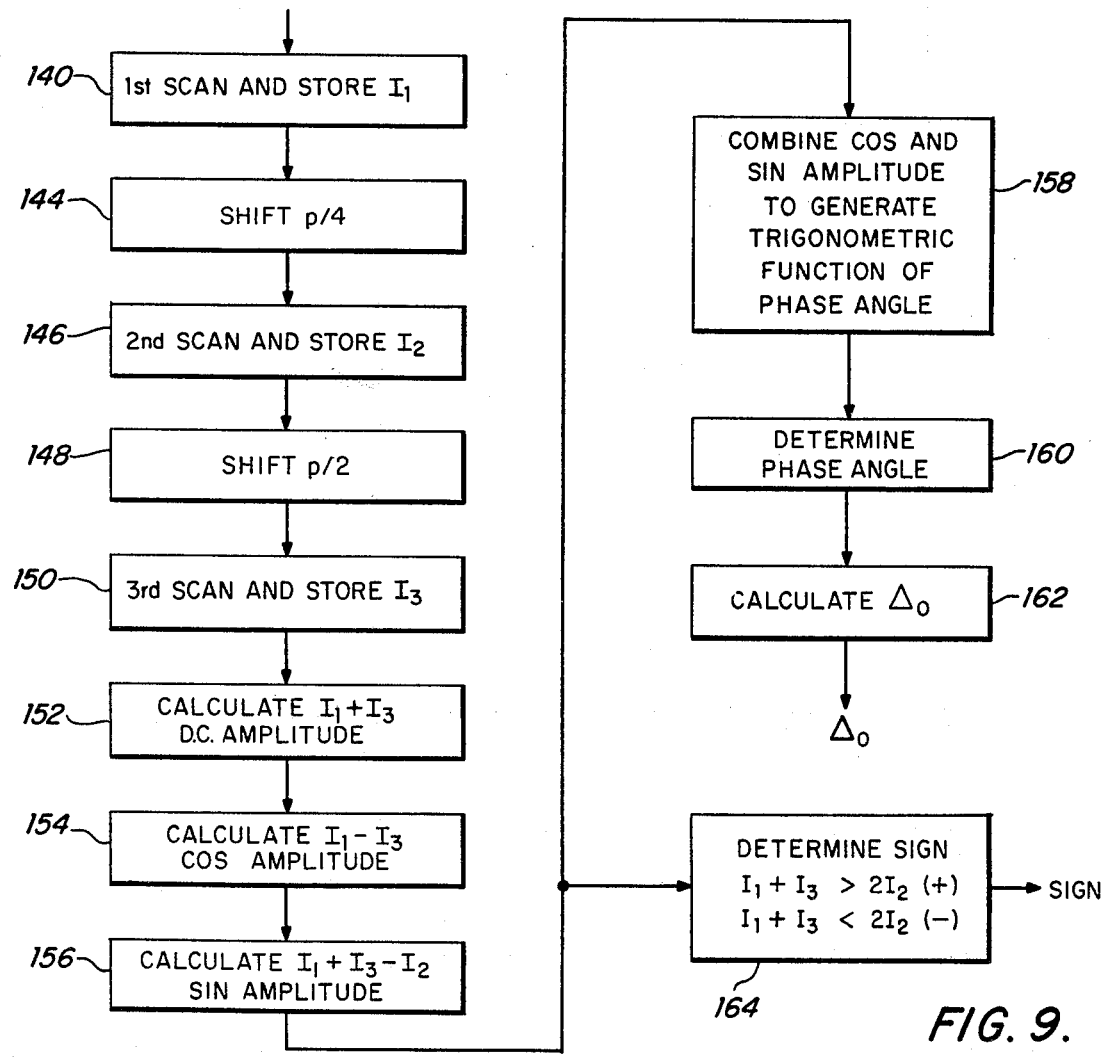
FIG. 9 is a flow chart showing the simplified method of this invention.

The method of this invention may be more easily understood from the flow diagram, FIG. 9, wherein at the first or zero step the first scan is made and the level of intensity $I_1$ is stored for each detector 140. Following this, the pattern is shifted by one quarter period 144, and the second scan and store of $I_2$ is accomplished, 146. The optical path length difference is then shifted by a quarter period to obtain a total shift of a half period 148, and the third scan and store of intensity $I_3$ is accomplished, 150. Then the d.c. amplitude is calculated from $I_1+I_3$, 152. The cosine amplitude is calculated from $I_1-I_3$, 154, and the sine amplitude is calculated from $I_1+I_3-I_2$, 156. Once this has been done, the cosine and sine amplitudes are combined to generate any particular trigonometric function of the phase angle. This phase angle is then determined, 160, and used to calculate the height $\Delta_0$ of the surface at a particular detector 162. The method is carried out for each of the detectors in the detector circuit. The sign of $\Delta_0$ may be determined by comparing the d.c. amplitude term $I_1+I_3$ with twice the intensity $I_2$, 164; and if the d.c. amplitude term is greater indicating a positive sign and if it is smaller indicating a negative sign.

The operations performed by arithmetic circuit 22 in conjunction with storage circuit 20, as well as those performed by the sign-determining circuit 30, trigonometric function generator 32, and height calculator 34, may be carried out using a micro-processor such as an Intel-8080 or by a properly programmed digital minicomputer. The table look-up function of height calculator circuit 34 may be implemented by an EPROM. Subsequent to obtaining $\Delta_0$ and the sign, these outputs may be further processed, as is known in the prior art, to detect and eliminate any tilt and tip factors between the two surfaces being compared and to ascertain the n order determination to resolve any uncertainties of $\Delta_0$ between zero and p/2. Since the resolution of this system is not critically dependent on the spatial frequency or period of the projected pattern a higher F number optical system can be used to obtain the same or increased resolution while providing even more improved depth of field or height operating range.

Other embodiments will occur to those skilled in the art and are within the following claims:

What is claimed is:

1. A surface contouring system comprising:
   means for projecting a sinusoidal pattern on a surface to be tested;
   means for shifting the pattern in three steps at one quarter period intervals of the sinusoidal pattern;
   mask means containing the same sinusoidal pattern;
   at least one detector for sensing, through said mask means, the intensity of the radiation from the test surface;
   means for scanning each said detector at each step to obtain from each detector a signal representative of the level of intensity at each detector;
   means for storing each intensity level derived from each detector at each of said steps;
   means responsive to said storing means for determining the d.c. spatial frequency amplitude from the sum of the intensity levels derived from the first and third steps; for determining the cosinusoidal spatial frequency amplitude from the difference between the intensity levels derived from the first and third steps and for determining the sinusoidal spatial frequency amplitude and intensity level derived from the second step;
   means for combining said sinusoidal and cosinusoidal spatial frequency amplitudes to generate an amplitude representative of a trigonometric function of the phase angle of the radiation from the test surface; and
   means, responsive to said amplitude representative of a trigonometric function of the phase angle, for generating an output representative of the height of the test surface at each position monitored by a said detector.

2. The system of claim 1 further including means for comparing the d.c. spatial frequency amplitude to twice the intensity level at the second step; and means responsive to the former being greater than the latter for indicating that the sign of the height is positive, and responsive to the converse for indicating that the difference is negative 3. The system of claim 1 in which said means for storing includes means for converting from analog to digital signals, said signals representative of levels of intensity from said means for scanning.

4. The system of claim 1 in which said means for determining the d.c. spatial frequency amplitude includes means for adding, and said means for determining the cosinusoidal and sinusoidal spatial frequency amplitude each includes means for subtracting.

5. The system of claim 1 in which said means for combining includes means for dividing said sinusoidal by said cosinusoidal spatial frequency amplitude and said trigonometric function produced is the tangent.

6. The system of claim 1 in which said means for combining includes means for squaring said cosinusoidal amplitude, means for squaring said sinusoidal amplitude, and means for adding the squared cosinusoidal and sinusoidal amplitudes.

7. The system of claim 6 in which said means for combining further includes means for dividing said cosinusoidal amplitude squared by the sum of the squares of said cosinusoidal and sinusoidal amplitudes and the trigonometric function produced is the cosine squared.

8. The system of claim 6 in which said means for combining further includes means for dividing said sinusoidal amplitude squared by the sum of the squares of said cosinusoidal and sinusoidal amplitudes and the trigonometric function produced is the sine squared.

9. The system of claim 6 in which said means for combining further includes means for producing the square root of the sum of the squares of the cosinusoidal and sinusoidal amplitudes.

10. The system of claim 9 in which said means for combining further includes means for dividing said cosinusodial amplitude by the square root of the sum of the squares of said cosinusoidal and sinusoidal amplitudes and said trigonometric function produced is cosine.

11. The system of claim 9 in which said means for combining further includes means for dividing said sinusoidal amplitude by the square root of the sum of the squares of said cosinusoidal and sinusoidal amplitudes and said trigonometric function produced is sine.

12. The system of claim 1 in which said means for generating includes means for storing a table of trigonometric functions, means for comparing the generated trigonometric function with said table of functions, to determine the phase angle; and means for combining that phase angle with the ratio of $2\pi$/period to generate the height of the surface.

13. A method of surface contouring comprising:
projecting a sinusoidal pattern on a surface to be tested;
shifting the pattern in three steps at one-quarter period intervals of the sinusoidal pattern;
sensing the intensity of the radiation from the test surface through a mask containing the same sinusoidal pattern at at least one position of the surface at each of said steps;
storing the intensity sensed at each position at each step;
for each of said positions, adding the intensity at the first and third steps to produce the d.c. spatial frequency amplitude, subtracting the intensity at the third step from that at the first to obtain the cosinusoidal spatial frequency amplitude and subtracting the intensity at the second step from the d.c. amplitude to produce the sinusoidal spatial frequency amplitude;
combining the sinusoidal and cosinusoidal amplitudes to produce a trigonometric function of the phase angle of the radiation from the test surface; and
generating from the trigonometric function of the phase angle an output representative of the height of the surface at each position.

14. The method of claim 13 further including comparing the d.c. amplitude to twice the intensity level at the second step; and indicating that the sign of the height is positive when the former is greater and negative when it is smaller.